United States Patent
Yang et al.

(10) Patent No.: US 12,518,357 B2
(45) Date of Patent: Jan. 6, 2026

(54) VIDEO DENOISING METHOD AND MOBILE TERMINAL, AND STORAGE MEDIUM

(71) Applicant: BIGO TECHNOLOGY PTE. LTD., Singapore (SG)

(72) Inventors: Min Yang, Guangzhou (CN); Bingyi Song, Guangzhou (CN)

(73) Assignee: BIGO TECHNOLOGY PTE. LTD., Singapore (SG)

( * ) Notice: Subject to any disclaimer, the term of this patent is extended or adjusted under 35 U.S.C. 154(b) by 561 days.

(21) Appl. No.: 17/999,172

(22) PCT Filed: Apr. 2, 2021

(86) PCT No.: PCT/CN2021/085251
§ 371 (c)(1),
(2) Date: Nov. 17, 2022

(87) PCT Pub. No.: WO2021/232963
PCT Pub. Date: Nov. 25, 2021

(65) Prior Publication Data
US 2023/0196516 A1   Jun. 22, 2023

(30) Foreign Application Priority Data
May 20, 2020 (CN) .......................... 202010431670.4

(51) Int. Cl.
*G06T 5/70* (2024.01)
*H04N 23/68* (2023.01)

(52) U.S. Cl.
CPC ............ *G06T 5/70* (2024.01); *H04N 23/6812* (2023.01); *H04N 23/683* (2023.01); *G06T 2207/10016* (2013.01)

(58) Field of Classification Search
CPC ............ G06T 5/70; G06T 2207/10016; H04N 23/6812; H04N 23/683; H04N 5/213; H04N 5/911; H04N 17/00
See application file for complete search history.

(56) References Cited

U.S. PATENT DOCUMENTS

2009/0310884 A1   12/2009   Lee et al.
2015/0156445 A1    6/2015   Lee

FOREIGN PATENT DOCUMENTS

CN   101394473 A     3/2009
CN   101394473 B  *  6/2010
(Continued)

OTHER PUBLICATIONS

"Hui Lou et al., Example-based Human Motion Denoising, 2009, IEEE Transactions on Visualization and Computer Graphics" (Year: 2009).*
(Continued)

*Primary Examiner* — Michael Horabik
*Assistant Examiner* — Phuong Hau Cai
(74) *Attorney, Agent, or Firm* — Kolitch Romano Dascenzo Gates LLC

(57) ABSTRACT

Provided is a video denoising method, applicable to a mobile terminal. The method includes acquiring video data, acquiring environmental parameters related to denoising in an environment of the mobile terminal, calculating an extent of conflict between the environment and the denoising based on the environmental parameters, and determining, based on the extent of conflict, a state of denoising the video data.

18 Claims, 3 Drawing Sheets

(56) References Cited

FOREIGN PATENT DOCUMENTS

| CN | 101744628 | A |   | 6/2010  |
|----|-----------|---|---|---------|
| CN | 104349080 | A |   | 2/2015  |
| CN | 105794221 | A |   | 7/2016  |
| CN | 105913403 | A |   | 8/2016  |
| CN | 104349080 | B | * | 12/2018 |
| CN | 111614867 | A |   | 9/2020  |

OTHER PUBLICATIONS

"Khai N. Truong et. al., Preventing Camera Recording by Designing a Capture-Resistant Environment, 2005, Part of the book series: Lecture Notes in Computer Science, LNISA, vol. 3660" (Year: 2005).*
"Abdelrahman Abdelhamed et. al., A High-Quality Denoising Dataset for Smartphone Cameras, 2018, Proceedings of the IEEE Conference on Computer Vision and Pattern Recognition, pp. 1692-1700" (Year: 2018).*
International Search Report of the International Searching Authority for State Intellectual Property Office of the People's Republic of China in PCT application No. PCT/CN2021/085251 issued on Jul. 6, 2021, which is an international application to which this application claims priority.
The State Intellectual Property Office of People's Republic of China, First Office Action in Patent Application No. CN202010431670.4 issued on Sep. 28, 2021, which is a foreign counterpart application corresponding to this U.S. Patent Application, to which this application claims priority.

* cited by examiner

VIDEO DENOISING METHOD AND MOBILE TERMINAL, AND STORAGE MEDIUM

CROSS-REFERENCE TO RELATED DISCLOSURE

This application is a U.S. national stage of international application No. PCT/CN2021/085251, filed on Apr. 2, 2021, which claims priority to Chinese Patent. Application No. 202010431670.4, filed on May 20, 2020, the contents of which are incorporated herein by references in their entireties.

TECHNICAL FIELD

The present disclosure relates to the field of video processing technologies, and in particular, relates to a video denoising method and a mobile terminal, and a storage medium.

BACKGROUND

With rapid developments of mobile Internet and mobile terminals, video data in the mobile terminal has become a common information carrier in human activities. For example, live streams, video calls, and the like include a large amount of information and serve as an access to exterior original information.

SUMMARY

Embodiments of the present disclosure provide a video denoising method and a mobile terminal, and a storage medium.

A video denoising method is provided. The method is applicable to a mobile terminal. The method includes: acquiring video data; acquiring environmental parameters related to denoising in an environment of the mobile terminal; calculating an extent of conflict between the environment and the denoising based on the environmental parameters; and determining, based on the extent of conflict, a state of denoising the video data; wherein calculating the extent of conflict between the environment and the denoising based on the environmental parameters comprises: substituting the environmental parameters related to the denoising into a predetermined mapping function, calculating a matching degree of a current environment of the mobile terminal and the denoising, and determining the matching degree as the extent of conflict, wherein a target weight is set for each of the environmental parameters to adjust importance of the environmental parameters.

A video denoising mobile terminal is further provided. The video denoising mobile terminal includes: one or more processors; a memory, configured to store one or more programs; wherein the one or more processors, when loading and running the one or more programs, are caused to perform the video denoising method as described above.

A non-transitory computer-readable storage medium is further provided. The non-transitory computer-readable storage medium stores one or more computer programs, wherein the one or more computer programs, when loaded and run by a processor, cause the processor to perform the video denoising method as described above.

DETAILED DESCRIPTION

The present disclosure is described hereinafter in conjunction with the embodiments and the accompanying drawings.

With rapid developments of mobile Internet and mobile terminals, video data in the mobile terminal has become a common information carrier in human activities. Acquired video data can include noise due to factors such as sensors, transmission, storage, especially in a dark environment. Due to appearance of the noise, users can give the video data a poor evaluation on the quality of the video data.

The noise can be a factor that obstructs understanding of the accepted information due to its effects on the sensing organs of the user. For example, random changes of luminance and colors of pixel points in the video data can interfere the user to watch the video data.

Thus, the video data is usually denoised, such that useless information in the video data is removed as much as possible while a completeness of the original information (that is, main features) is ensured.

The denoising is usually performed by estimating noise in a current frame, and determining appropriate parameters for the denoising. Because the denoising is performed continuously, a consumed compute power is great, and robustness of the denoising is poor in the case that performance of the mobile terminal is limited.

First Embodiment

Figure 1:
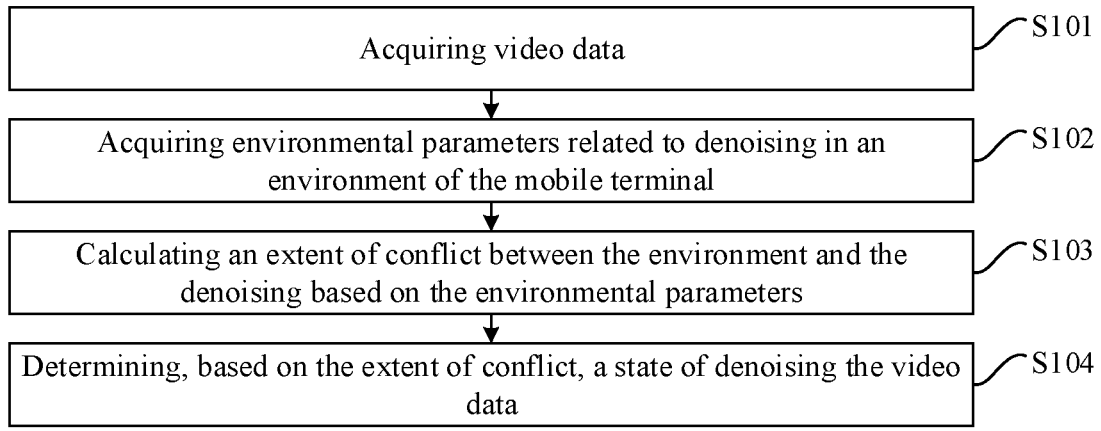
FIG. 1 is a flowchart of a video denoising method according to some embodiments of the present disclosure.

FIG. 1 is a flowchart of a video denoising method according to some embodiments of the present disclosure. The embodiments are applicable to a case that whether to perform the denoising is determined based on an environment of a mobile terminal. The method is performed by a video denoising apparatus. The video denoising apparatus is implemented by hardware and/or software, and is configured in a mobile terminal, for example, a mobile phone, a tablet computer, a smart wearable device (e.g., a smart watch or a smart glass), and the like. The method includes the following processes.

In S101, video data is acquired.

In the embodiments of the present disclosure, the mobile terminal is provided with one or more cameras configured to take photo and video. The camera is disposed on a rear of the mobile terminal (also referred to as a rear camera), or a front of the mobile terminal (also referred to as a front camera), which is not limited in the embodiments of the present disclosure.

An operating system of the mobile terminal includes Android, iOS, Windows, and the like, and supports running of various applications, for example, a shopping application, an instant messaging application, a live streaming application, a video conferencing application, a short video application, and the like.

Figure 2:
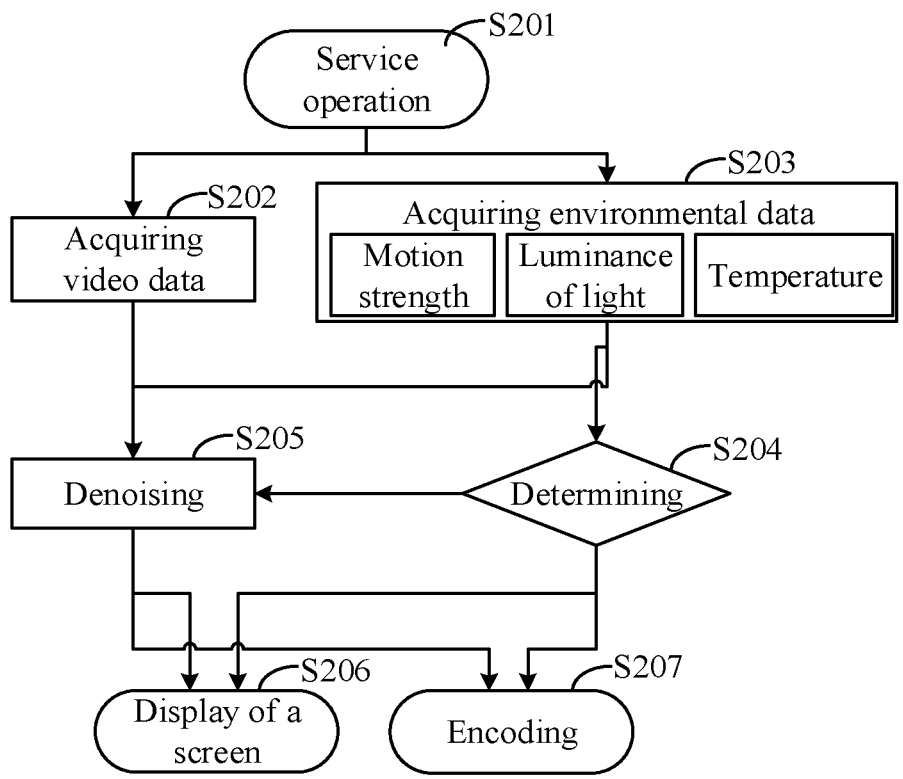
FIG. 2 is a schematic flowchart of denoising according to some embodiments of the present disclosure.

As shown in FIG. 2, in S201, service operations are performed in the application. In S202, video data is acquired by calling the camera, and hence related service operations are performed. For example, in an Android system, the video data is acquired by calling MediaRecorder. For example, in an iOS system, the video data is acquired by calling AVCaptureFileOutputRecordingDelegate in AVFoundation, and the like.

The service operations for the video data acquired by the applications are different due to various service scenarios.

Generally, the video data acquired by the applications is directed to real-time service operations.

In some embodiments, in a service scenario of shopping, the video data acquired by the shopping application is directed to service operations for selling goods, for example, describing and showing the goods by an anchor user, and the like, and a link for shopping is also provided in the video data.

In some embodiments, in a service scenario of instant messaging, the video data acquired by the instant messaging application is directed to service operations for a video call, that is, a session of various users in communication.

In some embodiments, in a service scenario of live streaming, the video data acquired by the live streaming application is directed to service operations for live-streaming, that is, showing talent or describing a game by an anchor user, and the like.

In some embodiments, in a service scenario of conferencing, the video data acquired by the video conference application is directed to service operations for a conference, for example, sequentially speaking as a moderator by multiparty users participating in the conference, and the like.

In some embodiments, the video data acquired by the applications may be directed to service operations with low real-time requirements. For example, the short video application uses the acquired video data as the short video, and the like, which is not limited in the embodiments.

In S102, environmental parameters related to denoising are acquired in an environment of the mobile terminal.

In the embodiments, as shown in FIG. 2, parameters related to the denoising are acquired based on the environment of the mobile terminal and determined as the environmental parameters in S203 when the video data is acquired on the mobile terminal.

The environment of the mobile terminal includes an exterior environment and an interior environment. The exterior environment is an environment at the exterior of the mobile terminal, and the interior environment is an environment at the interior of the mobile terminal.

In some embodiments, as shown in FIG. 2, the environmental parameters include at least one of the follows.

1. Motion Strength of the Mobile Terminal in the Exterior Environment

The motion strength manifests a motion state of a user holding a mobile terminal to some extent. In the case that a motion is great, human eyes pay less attention to the noise in the video data. In addition, denoising the image data with great motion is prone to blur, such that a quality of the video data is reduced.

Therefore, in the case that the denoising is performed when the user is in a quick motion state, processes related to the denoising can increase resource occupation of a central processing unit (CPU), a memory, and the like in the mobile terminal without efficient denoising effect.

The mobile terminal is provided with a sensor for detecting the motion state, for example, an inertial measurement unit (IMU) with a 3-axis acceleration sensor, a separate 3-axis acceleration sensor, a separate gyroscope, and the like. In the embodiments, the sensor is called to detect a first acceleration of motion of the mobile terminal in an X-axis direction, a second acceleration of motion of the mobile terminal in a Y-axis direction, a third acceleration of motion the mobile terminal in a Z-axis direction in the exterior environment.

In some embodiments, in the Android system, the acceleration detected by the 3-axis acceleration sensor (ACCELEROMETER) is registered and listened by SensorManager.

In some embodiments, in the iOS system, a CoreMotion framework is provided. The CoreMotion framework provides an application programming interface (API), and is also referred to as CMMotionManager. For the API, by constructing a CMMotionManager object, data, such as acceleration data, gyroscope data, and the like, is periodically acquired from the CMMotionManager object using a timer.

As the first acceleration, the second acceleration, and the third acceleration manifest the motion strength to some extent, the motion strength is calculated in a linear fusion manner.

A first product of the first acceleration and a predetermined first acceleration weight is calculated, a second product of the second acceleration and a predetermined second acceleration weight is calculated, and a third product of the third acceleration and a predetermined third acceleration weight is calculated. A sum of the first acceleration weight, the second acceleration weight, and the third acceleration weight is equal to 1.

A sum of the first product, the second product, and the third product is calculated, and is determined as the motion strength of the mobile terminal in the exterior environment.

The linear fusion manner is represented by the following formula:

$$I=\alpha_1 \cdot x' + \alpha_2 \cdot y' + \alpha_3 \cdot z';$$

$$\Sigma_{i=1}^{3} \alpha_i = 1.$$

In the formula, I represents the motion strength, $x'$ represents the first acceleration, $y'$ represents the second acceleration, $z'$ represents the third acceleration, $\alpha_1$ represents the first acceleration weight, $\alpha_2$ represents the second acceleration weight, and $\alpha_3$ represents the third acceleration weight.

Alternatively, the motion strength of the mobile terminal in the exterior environment may be calculated in other manners. For example, the sum of the first acceleration, the second acceleration, and the third acceleration is determined as the motion strength of the mobile terminal in the exterior environment, and the like, which is not limited in the embodiments.

2. Luminance of Light in the Exterior Environment

In a strong light exterior environment, a noise level of acquired video data is low. In this case, once the denoising is performed, the processes related to the denoising can increase resource occupation of the CPU, the memory, and the like in the mobile terminal without an efficient denoising effect.

Where the mobile terminal is provided with a sensor for detecting the light, for example, a light intensity sensor, and the like, and the API of the sensor is opened, the sensor is directly called to detect the luminance of the light in the exterior environment.

In some embodiments, in the Android system, the intensity of the light detected by the light intensity sensor (LIGHT) is registered and listened by SensorManager.

Where the mobile terminal is provided with the sensor for detecting the light, and the API of the sensor is not opened, in the case that the mobile terminal automatically adjusts a luminance of a screen based on the intensity of the light, or the mobile terminal automatically adjusts a white balance and other relationships based on the intensity of the light by opening the camera, the luminance of the screen is detected and is mapped as the intensity of the light, or the intensity of the light is read from the camera of the mobile terminal, and the like.

3. Temperature in the Interior Environment

In the case that the mobile terminal continuously acquires the video data of video call, video conference, and the like operations, a heavy load can cause an increase of a temperature of the mobile terminal, such that a measure of down frequency by the mobile terminal for the CPU is triggered. The down frequency for the CPU affects a real time encoding speed of the video data, and the service operations are greatly affected.

Therefore, in the case that the temperature of the mobile terminal increases, once the denoising is performed, the processes related to the denoising increase resource occupation of the CPU, the memory, and the like in the mobile terminal, and have a negative effect on the service operations.

In some embodiments, commands of the operating system, such as "cat/sys/class/thermal/thermal_zonex/temp" in the Android system, are directly called to read the temperature in the interior environment of the mobile terminal.

The interior of the mobile terminal is provided with multiple devices to detect the temperature, for example, a temperature of the CPU, a temperature of a battery, and the like. In this case, a temperature of a specific device (for example, the CPU) is determined as the temperature of the interior environment of the mobile terminal, the temperature of the interior environment of the mobile terminal is acquired by the linear fusion of the temperatures of all devices, the greatest temperature is determined as the temperature of the interior environment of the mobile terminal, or the like, which is not limited in the embodiments.

The environmental parameters and acquisition manners thereof are merely exemplary. In implementing the embodiments, other environmental parameters and acquisition manners thereof are set based on actual cases, for example, an occupancy of the CPU, an occupancy of the memory, and the like, which is not limited in the embodiments. In addition, except for above environmental parameters and acquisition manners thereof, other environmental parameters and acquisition manners thereof are used based on actual requirements, which is not limited in the embodiments.

Figure 3:
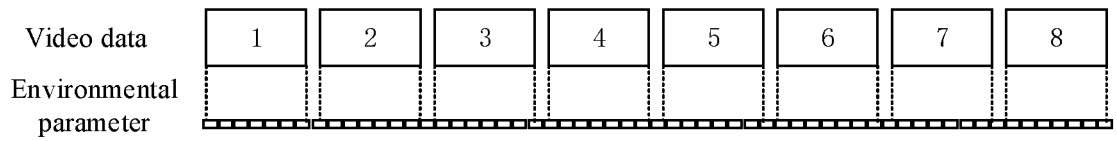
FIG. 3 is a comparison diagram of frame rates of video data and environment parameters according to some embodiments of the present disclosure.

As shown in FIG. 3, in practice, a frame rate of acquiring the video data by the mobile terminal and a frame rate of acquiring the environment parameters by the mobile terminal are different, and the frame rate of acquiring the environment parameters is generally greater than the frame rate of acquiring the video data. That is, there are generally a plurality of environment parameters between two frames of image data in the video data.

In the embodiments, the image data and the environment parameters are aligned in a segmented manner to ensure the stability of the denoising and the environment parameters.

In some embodiments, a plurality of environmental parameters at various time points between a current frame of image data and a previous frame of image data are acquired, and each of the plurality of environmental parameters is determined as a reference parameter, such that the plurality of environmental parameters are segmented into a plurality of segments with a reference of the video data.

For each of the plurality of segments of environmental parameters, the plurality of reference parameters are smoothed, and smoothing results are determined as the environmental parameters of the current frame of image data, such that differences of correlation of the image data and the environmental parameters at various time points over the time series are shown.

In one smoothing manner, a reference weight is set for each of the plurality of reference parameters, and the reference weight manifests an importance of the reference parameter. That is, the more important the reference parameter, the greater the reference weight.

In some embodiments, a time point for acquiring each of the plurality of reference parameters is determined, and the reference weight is set for each of the plurality of reference parameters based on the time point. The reference weight is positively correlated with the time point. That is, in the case that the time point for acquiring the reference parameter is closer to a current time point, correlation of the reference parameter and the current frame of image data is greater, and the set reference weight is greater. In the case that the time point for acquiring the reference parameter is farther away from the current time point, the correlation of the reference parameter and the current frame of image data is less, and the set reference weight is less, such that the reference weights monotonically decrease from the current frame of image data to the previous frame of image data.

In addition to determine the reference weight using time point, the reference weight may be set in other manner. For example, a reciprocal of a value of the reference parameter is determined as the reference weight or the like, which is not limited in the embodiments.

After the corresponding reference weight is set for each of the plurality of reference parameters, a fourth product of each of the plurality of reference parameters and the reference weight of each of the plurality of reference parameters is calculated. A ratio of a first target value to a second target value is calculated, and the ratio is determined as the environmental parameter of the current frame of image data. The first target value is a sum of all fourth products, and the second target value is a sum of all reference weights. Thus, the environmental parameter is represented by the following formula:

$$\hat{y}_t = \frac{\sum_{i=0}^{n} w_i * y_{t-i}}{\sum_{i=0}^{n} w_i}.$$

In the formula, $\hat{y}_t$ represents environmental parameters of $t^{th}$ frame of image data, n environmental parameters (that is, reference parameters) are present between $t^{th}$ frame of image data and $(t-1)^{th}$ frame of image data, $y_{t-i}$ represents $i^{th}$ environmental parameter in the front of the $t^{th}$ frame of image data, and $w_i$ represents $i^{th}$ reference weight.

In S103, an extent of conflict between the environment and the denoising is calculated based on the environmental parameters.

In the embodiments, one or more environmental parameters related to the denoising are substituted into a predetermined mapping function, and a matching degree of the current environment of the mobile terminal and the denoising is calculated and determined as the extent of conflict.

In some embodiments, the mapping function is a linear fusion function. In response to at least one of the environmental parameters being acquired, a target weight is set for each of the at least one environmental parameter. The target weight is an adjusting parameter configured to adjust importance of various environmental parameters.

A fifth product of each of the at least one environmental parameter and the target weight of each of the at least one environmental parameter is calculated, a sum of all fifth products is calculated, and the sum is determined as the extent of conflict between the environment and the denoising. Thus, the extent of conflict is represented by the following formula:

$$P_t = \sum_{k=1}^{m} w_k * \hat{y}_{tk}.$$

In the formula, $P_t$ represents the extent of conflict of the $t^{th}$ frame of image data, the $t^{th}$ frame of image data corresponds to m environmental parameters, $\hat{y}_{tk}$ represents $k^{th}$ environmental parameter, and $w_k$ represents $k^{th}$ target weight.

By taking the motion strength of the mobile terminal in the exterior environment, the luminance of the light in the exterior environment of the mobile terminal, and the temperature in the interior environment of the mobile terminal as an example, the extent of conflict between the environment and the denoising is calculated based the following formula:

$$P_t = \alpha I_t' + \beta L_t' + \gamma T_t'.$$

In the formula, $P_t$ represents the extent of conflict of the $t^{th}$ frame of image data, $I_t'$ represents the motion strength of the mobile terminal in the exterior environment, $L_t'$ represents the luminance of the light in the exterior environment of the mobile terminal, $T_t'$ represents the temperature in the interior environment of the mobile terminal, $\alpha$, $\beta$, and $\gamma$ represent the target weights, and $\alpha$, $\beta$, and $\gamma \in [0, 1]$.

In addition to the linear fusion, the extent of conflict between the environment and the denoising may be calculated in other manners. For example, a standardization is performed on the environmental parameters, the standardized environmental parameters are summed, and the acquired sum is determined as the extent of conflict between the environment and the denoising, and the like, which is not limited in the embodiments.

In S104, a state of denoising the video data is determined based on the extent of conflict.

In the embodiments, as shown in FIG. 2, in S204, the state of denoising the video data is determined based on the extent of conflict between the environment and the denoising, that is, whether to perform the denoising is determined. In the case that a condition is satisfied, the denoising the video data is allowed. In the case that the condition is not satisfied, denoising the video data is disallowed.

In some embodiments, the environmental parameter is positively correlated with the extent of conflict. That is, the greater the environmental parameters, the greater the extent of conflict between the environment and the denoising. The fewer the environmental parameters, the less the extent of conflict between the environment and the denoising.

In some embodiments, for the formula $P_t = \alpha I_t' + \beta L_t' + \gamma T_t'$, the greater the motion strength of the mobile terminal in the exterior environment, the greater the extent of conflict between the environment and the denoising, and the more unfit the denoising; the greater the luminance of the light in the exterior environment of the mobile terminal, the greater the extent of conflict between the environment and the denoising, and the more unfit the denoising; the higher the temperature in the interior environment of the mobile terminal, the greater the extent of conflict between the environment and the denoising, and the more unfit the denoising, and the like.

In some embodiments, the extent of conflict is compared with a predetermined threshold.

In the case that the extent of conflict is greater than the predetermined threshold, the extent of conflict between the environment and the denoising is greater, and the state of denoising the video data disallows denoising the video data.

In the case that the extent of conflict is less than or equal to the predetermined threshold, the extent of conflict between the environment and the denoising is less, and the state of denoising the video data allows denoising the video data.

In the embodiments, for a case where the denoising is disallowed, the video data is processed based on the service scenarios, which is not limited in the embodiments.

In some embodiments, as shown in FIG. 2, in S206, for the video data prohibited from denoising in S204, the video data is displayed in a screen; and in S207 the video data is coded, for example, in an H.264 format, and encapsulated in a flash video (FLV) format to be sent to a device playing the video data.

For example, video data is acquired, environmental parameters related to denoising are acquired based on an environment of the mobile terminal, an extent of conflict between the environment and the denoising is calculated based on the environmental parameters, and a state of denoising the video data is determined based on the extent of conflict. On one hand, the denoising is normally performed in the case that the environment allows the denoising, such that the quality of the video data is ensured. On the other hand, the denoising is disallowed in an unsuitable environment, and a frequency of the denoising is reduced, such that the compute power of the denoising is saved, the resource occupation of the CPU, the memory, and the like is reduced, and more compute power is remained to ensure the normal running of the service operations. Furthermore, the flexibility of the denoising is improved, and the robustness of the denoising is improved.

Second Embodiment

Figure 4:
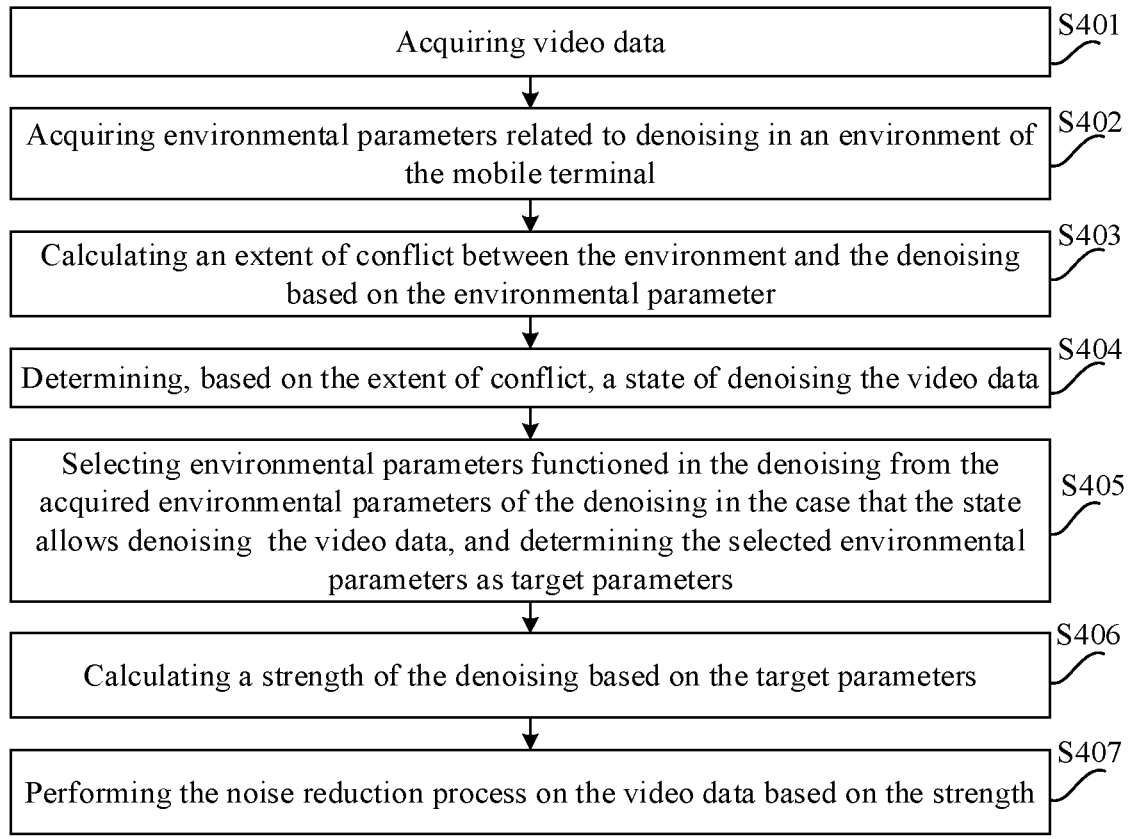
FIG. 4 is a flowchart of a video denoising method according to some embodiments of the present disclosure.

FIG. 4 is a flowchart of a video denoising method according to some embodiments of the present disclosure, a process of performing the denoising in the appropriate environment in response to allowing the denoising is added in the embodiments based on above embodiments.

The method includes the following processes.

In S401, video data is acquired.

In S402, environmental parameters related to denoising are acquired in an environment of the mobile terminal.

In S403, an extent of conflict between the environment and the denoising is calculated based on the environmental parameters.

In S404, a state of denoising the video data is determined based on the extent of conflict.

In S405, environmental parameters functioned in the denoising are selected from the acquired environmental parameters of the denoising in the case that the state allows denoising the video data, and the selected environmental parameters are determined as target parameters.

In the embodiments, as shown in FIG. 2, where the current state allows denoising the video data in S204, some environmental parameters functioned in the denoising are selected from the environmental parameters acquired in S203 and determined as the target parameters, and the target parameters are sent to codes corresponding to the denoising in a Java native interface (JNI) format, and the like.

In some embodiments, where the acquired environmental parameters are the motion strength of the mobile terminal in the exterior environment, the luminance of the light in the exterior environment of the mobile terminal, and the temperature in the interior environment of the mobile terminal, the motion strength of the mobile terminal in the exterior environment and the luminance of the light in the exterior environment of the mobile terminal are selected to function in the denoising. The motion strength of the mobile terminal in the exterior environment and the luminance of the light in the exterior environment of the mobile terminal are in a prior function. In the case that the motion of the current mobile terminal is great, a global motion vector of the acquired video data is great. In the case that a global motion vector is great, the human eyes are insensitive to the noise, and the denoising is adjusted accordingly. In the case that the luminance of the light in the exterior environment of the mobile terminal is less, global noise in the acquired video data increases, and the denoising is adjusted accordingly.

In S406, a strength of the denoising is calculated based on the target parameters.

In the embodiments, the parameters of the denoising are adjusted based on the target parameters, such that the denoising is matched with the current environment.

In some embodiments, the strength of the denoising is calculated based on the target parameters, such that the strength of the denoising is positively correlated with the target parameters. That is, the greater the target parameters, the greater the strength of the denoising. The less the target parameters, the less the strength of the denoising.

In some embodiments, for the motion strength of the mobile terminal in the exterior environment and the luminance of the light in the exterior environment of the mobile terminal, in the case that the motion strength of the mobile terminal in the exterior environment is greater, and the luminance of the light in the exterior environment of the mobile terminal is greater, denoising with a higher strength is performed on the video data. That is, a code rate of the current video data is compressed, pressure on network transmission is reduced, and image freezing in the network transmission is mitigated.

In some embodiments, the strength of the denoising is calculated in a linear fusion manner By taking the motion strength of the mobile terminal in the exterior environment and the luminance of the light in the exterior environment of the mobile terminal as an example, a sixth product of the motion strength and a predetermined motion weight is calculated, a seventh product of the luminance and a predetermined luminance weight is calculated, a sum of the sixth product, the seventh product, and a predetermined adjustment parameter is calculated, and the sum is determined as the strength of the denoising. Thus, the strength of the denoising is represented by the following formula:

$$f(I_t', L_t') = a \cdot I_t' + b \cdot L_t' + c.$$

In the formula, $f(I_t', L_t')$ represents acquired strength of the denoising, $I_t'$ represents the motion strength of the mobile terminal in the exterior environment, $L_t'$ represents the luminance of the light in the exterior environment of the mobile terminal, a represents the motion weight, $\alpha \in [0, 1]$, b represents a luminance weight, $b \in [0,1]$, and c represents the adjustment parameter, $c \in [0,1]$.

In S407, the denoising is performed on the video data based on the strength.

As shown in FIG. 2, after the current strength of the denoising is determined, the parameters related to the denoising are adjusted based on the strength to denoise the video data.

In some embodiments, the denoising includes the following implementations.

1. Deep Learning-Based Denoising Algorithm

There are multiple deep learning-based denoising algorithms. For example, neural network denoising is achieved using a stacked denoising auto-encoder, a multi-layer perceptron (MLP) mechanism, and the like.

In the case that the network is shallow, and the hardware of the mobile terminal is improved, the denoising is performed on the video data based on the deep learning-based denoising algorithm.

2. Non-Deep Learning-Based Denoising Algorithm

The non-deep learning-based denoising includes two-dimensional denoising (2D noise reduction, 2DNR) and 3D denoising (3D noise reduction, 3DNR).

The 2DNR is a spatial denoising algorithm. In the 2DNR, a window is filtered or block matched. Thus, where the denoising is the 2DNR, the window is set based on the strength, such that the video data is filtered or block matched using the window.

A size of the window is positively correlated with the strength. That is, the greater the strength, the greater the window; and the less the strength, the smaller the size of the window.

For the block matching, where a height of input image data is H, a width of input image data is W, a size of the window of the block matching is D*D, and a size of a selected block is d*d, a complexity of calculation is $O(HWD^2d^2)$.

For the filtering, where a height of input image data is H, a width of input image data is W, an algorithm complexity of Gaussian filtering is $O(HWd^2)$, d*d represents a size of a filtering window, and a time complexity of guided filtering is O(HW).

The original image data is protected by edge preserve operation on guidance image data in filtering, which includes the following filtering implementations.

2.1. Guided Filtering

In the guided filtering, the input image data P is filtered using guidance image data I, such that denoised image data Q is acquired. The guided filtering is represented by the following formula:

$$Q_i = \Sigma_{j \in w_j} W_{ij}(I) \cdot P_j.$$

In the formula, i represents a pixel point, j represents the window of the filtering, $W_{ij}$ (I) represents a value used in a weighted average calculation determined by the guidance image data I. The guidance image data is a separate frame of image data, or the image data P itself (in this case, a guided filter degrades to an edge preserving filter).

2.2. Joint Bilateral Filtering

In the joint bilateral filtering, the input image data is filtered using the guidance image data I, such that denoised image data J is acquired. In the case that the guidance image data I is the input image data itself, the joint bilateral filtering is bilateral filtering, which is represented by the following formula:

$$J_p = \frac{1}{k_p} \sum_{q \in \Omega} \hat{I}_q f(\|p - q\|) g(\|I_p - I_q\|).$$

In the formula, p represents a pixel point, q represents the window of the filtering, f(·) represents a spatial filter and indicates that a weight is calculated based on a distance between a current pixel point and surrounding pixel points, g(·) represents a range filter, and represents that a weight is calculated based on a difference of pixel values of a current pixel point and surrounding pixel points in the guidance image data, and $k_p$ represents a normalized parameter. In the case that a difference between the distance and the pixel value is great, a product of the distance and the pixel value is less, such that edge preservation is achieved.

The 3DNR is a spatial and temporal denoising algorithm. In the 3DNR, an assumption is made to indicate changes of the randomly generated noise in the video data with the time, and the relationship represented by the following function:

$$F(t)=F+N(t).$$

In the function, F(t) represents image data containing noise, F represents the original image data, N(t) represents the noise changing with the time, and the noise observes a Gaussian distribution with an average value being 0. Based on the law of large numbers, in the case that the N(t) is accumulated, the more the accumulation with the time, the closer to 0 the noise.

For the 3DNR, the video data in the embodiments is the original video data, that is, the video data without any processing (for example, white balance, luminance adjustment, and the like), generally in a YUV format. In this case, the noise in the video data most observes the Gaussian distribution with the average value being 0, such that an effect of the 3DNR is ensured.

In the case that the operating system in the mobile terminal is limited, and the original video data cannot be acquired, the denoising is performed on the video data processed in other processing (for example, white balance, luminance adjustment, and the like), which is not limited in the embodiments.

The video data includes a plurality of frames of image data, represented by P1, P2, ..., Pt−1, Pt, Pt+1, ..., Pn in a generated order. t and n are positive integers, and t+1 is less than n. As the video data is generated in real time, n is increased with the generation of the video data until generation of the video data stops.

In the embodiments, each of the plurality of frames of image data in the video data is traversed sequentially for the 3DNR. For convenient description, the current frame of image data to be denoised is referred to as the original image data, and the denoised previous frame of image data is referred to as the reference image data.

In this case, S407 includes following processes.

In S4071, a first mixing coefficient generated for reference image data is determined in response to the denoising being three-dimensional denoising.

In the embodiments, a probability of a pixel point in motion is estimated based on a single point or block and determined as a motion probability. In addition, a coefficient mapping function is predetermined, and is configured to map a target motion probability into a coefficient suitable for 3DNR.

The motion probability is substituted into the coefficient mapping function, and the output coefficient is determined as the first mixing coefficient. The first mixing coefficient is represented by the following equation:

$$w_u=f_u(P_1).$$

In the equation, $w_u$ represents the first mixing coefficient, $w_u \in [0, 1]$, $f_u(\cdot)$ represents a probability mapping function, and $P_1$ represents the motion probability.

In some embodiments, the coefficient mapping function is a linear function, for example, f(x)=gx+h. x represents the motion probability, and g and h represent hyper-parameters.

Except for the linear function, the coefficient mapping function is a nonlinear function in some embodiments, which is not limited in the embodiments.

In S4072, an eighth product of the strength and the first mixing coefficient is calculated and determined as a new first mixing coefficient, and the new first mixing coefficient is set for the reference image data.

In the embodiments, the eighth product of the strength of the denoising and the first mixing coefficient is calculated, the first mixing coefficient is updated based on the eighth product, and the updated first mixing coefficient is set for the reference image data.

In S4073, a second mixing coefficient is calculated based on the new first mixing coefficient, and the second mixing coefficient is set for original image data.

In the embodiments, a transformation relationship is present between the first mixing coefficient and the second mixing coefficient. The second mixing coefficient is calculated based on the transformation relationship, and the second mixing coefficient is set for original image data.

In some embodiments, the second mixing coefficient is acquired by subtracting the new first mixing coefficient from 1.

In S4074, target image data is acquired by superposing the original image data with the second mixing coefficient on the reference image data with the new first mixing coefficient.

In the embodiments, in the case that the first mixing coefficient and the second mixing coefficient are set, the reference image data and the original image data are superposed, and the superposed image data is image data upon the 3DNR, which is referred to as the target image data.

In this case, the 3DND is represented by the following formula:

$$B_t=w_u*R_u*B_{t-1}+(1-w_u*R_u)*F_t.$$

In the formula, $B_t$ represents the target image data, $w_u$ represents the first mixing coefficient, $R_u$ represents the strength, $w_u*R_u$ represents the new first mixing coefficient, $(1-w_t*R_u)$ represents the second mixing coefficient, $B_{t-1}$ represents the reference image data, and $F_t$ represents the original image data.

In the embodiments, for the denoised video data, sequential processing is performed based on the service scenarios, which is not limited in the embodiments.

In some embodiments, as shown in FIG. 2, in S206, the video data upon the 3DNR is displayed in a screen; and in S207, the denoised video data is coded, for example, in an H.264 format, and encapsulated in a flash video (FLV) format to be sent to a device playing the video data.

In the embodiments, environmental parameters functioned in the denoising are selected from the acquired environmental parameters related to the denoising in the case that denoising the video data is allowed, and the selected environmental parameters are determined as target parameters. A strength of the denoising is calculated based on the target parameters, and the strength of the denoising is positively correlated with the target parameters. The denoising is performed on the video data based on the strength, such that the strength of the denoising is matched with the environment, and a utilization efficiency of the computer power is improved. In addition, the code rate of the denoised video data is appropriate, such that the code rate is saved for the encoder, pressure on network transmission is reduced, and image freezing in the network transmission is mitigated.

Third Embodiment

Figure 5:
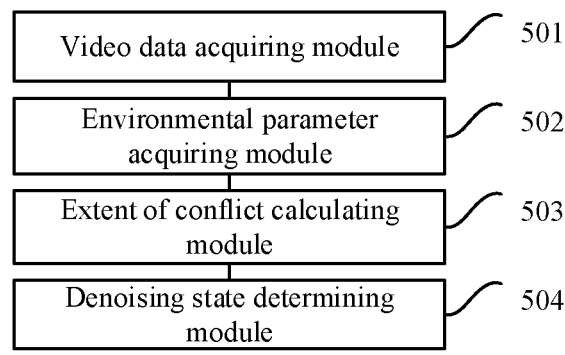
FIG. 5 is a schematic structural diagram of a video denoising apparatus according to some embodiments of the present disclosure.

FIG. 5 is a schematic structural diagram of a video denoising apparatus according to some embodiments of the present disclosure. The apparatus is applicable to a mobile terminal.

The apparatus includes: a video data acquiring module 501, configured to acquire video data; an environmental parameter acquiring module 502, configured to acquire environmental parameters related to denoising in an environment of the mobile terminal; an extent of conflict calculating module 503, configured to calculate an extent of conflict between the environment and the denoising based on the environmental parameters; and a denoising state determining module 504, configured to determine, based on the extent of conflict, a state of denoising the video data.

The video denoising apparatus in the embodiments performs the video denoising method according to any embodiment of the present disclosure, and has same functional modules and effects as the method.

Fourth Embodiment

Figure 6:
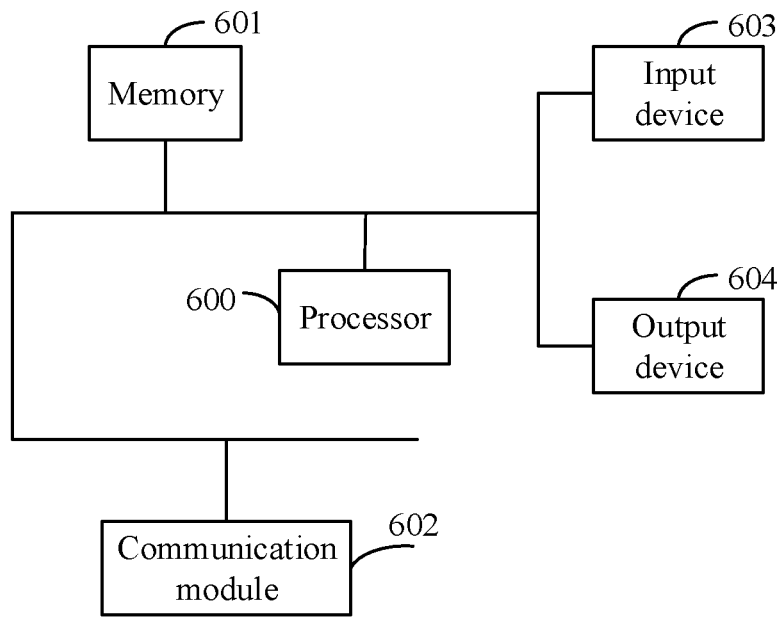
FIG. 6 is a schematic structural diagram of a mobile terminal according to some embodiments of the present disclosure.

FIG. 6 is a schematic structural diagram of a mobile terminal according to some embodiments of the present disclosure. As shown in FIG. 6, the mobile terminal includes a processor 600, a memory 601, a communication module 602, an input device 603, and an output device 604. The processor 600, the memory 601, the communication module 602, the input device 603, and the output device 604 are connected by a bus or in other fashions, and FIG. 6 uses the bus as an example.

The memory 601, as a computer-readable storage medium, is configured to store software programs, computer executable programs, and modules, for example, modules corresponding to the video denoising method in the embodiments (for example, the video data acquiring module 501, the environmental parameter acquiring module 502, the extent of conflict calculating module 503, and the denoising state determining module 504). The processor 600 achieves various functional applications and data processing of the mobile terminal, that is, the video denoising method in the above embodiments, by running or executing the software programs, instructions, and modules that are stored in the memory 601.

The processor 600 achieves various functional applications and data processing of the device, that is, the video denoising method in the above embodiments, by running and executing the software programs, instructions, and modules that are stored in the memory 601.

The mobile terminal in the embodiments performs the video denoising method according to any embodiment of the present disclosure, and implements corresponding functions and effects.

Fifth Embodiment

The embodiments of the present disclosure further provide a computer-readable storage medium. The computer-readable storage medium stores one or more computer programs. The one or more computer programs, when loaded and run by a processor, cause the processor to perform a video denoising method. The method includes: acquiring video data; acquiring environmental parameters of a denoising based on an environment of the mobile terminal; calculating an extent of conflict between the environment and the denoising based on the environmental parameters; and determining, based on the extent of conflict, a state of denoising the video data.

For the computer-readable storage medium in the embodiments of the present disclosure, the computer program is not limited to above method operations, and is further capable of performing related processes in the video denoising method according to any embodiment of the present disclosure.

What is claimed is:

1. A video denoising method, applicable to a mobile terminal, the method comprising:
   acquiring video data;
   acquiring environmental parameters related to denoising in an environment of the mobile terminal;
   calculating an extent of conflict between the environment and the denoising based on the environmental parameters; and
   determining, based on the extent of conflict, a state of denoising the video data;
   selecting environmental parameters functioned in the denoising from the acquired environmental parameters related to the denoising in the case that the state allows denoising the video data, and determining the selected environmental parameters as target parameters;
   calculating a strength of the denoising based on the target parameters, wherein the strength of the denoising is positively correlated with the target parameters; and
   performing the denoising on the video data based on the strength,
   wherein calculating the extent of conflict between the environment and the denoising based on the environmental parameters comprises:
   substituting the environmental parameters related to the denoising into a predetermined mapping function, calculating a matching degree of a current environment of the mobile terminal and the denoising, and determining the matching degree as the extent of conflict, wherein a target weight is set for each of the environmental parameters to adjust importance of the environmental parameters; and
   wherein performing the denoising on the video data based on the strength comprises:
   determining a first mixing coefficient generated for reference image data in response to the denoising being three-dimensional denoising, wherein the reference image data is a previous frame of image data with noise reduced;
   calculating an eighth product of the strength and the first mixing coefficient, determining the eighth product as a new first mixing coefficient, and setting the new first mixing coefficient for the reference image data;
   calculating a second mixing coefficient based on the new first mixing coefficient, and setting the second mixing coefficient for original image data, wherein the original image data is a current frame of image data to be noise reduced; and
   acquiring target image data by superposing the original image data with the second mixing coefficient on the reference image data with the new first mixing coefficient.

2. The method according to claim 1, wherein the environment comprises an exterior environment and an interior environment, and the environmental parameters comprise at least one of a motion strength of the mobile terminal in the exterior environment, a luminance of light in the exterior environment, and a temperature in the interior environment.

3. The method according to claim 1, wherein the environment comprises an exterior environment and an interior environment, and the environmental parameters comprise a motion strength of the mobile terminal in the exterior environment, and wherein acquiring the environmental parameters related to the denoising in the environment of the mobile terminal comprises:
 detecting a first acceleration of motion of the mobile terminal in an X-axis direction, a second acceleration of motion of the mobile terminal in a Y-axis direction, and a third acceleration of motion of the mobile terminal in a Z-axis direction in the exterior environment;
 calculating a first product of the first acceleration and a predetermined first acceleration weight;
 calculating a second product of the second acceleration and a predetermined second acceleration weight;
 calculating a third product of the third acceleration and a predetermined third acceleration weight; and
 calculating a sum of the first product, the second product, and the third product, and determining the sum as the motion strength of the mobile terminal in the exterior environment.

4. The method according to claim 1, wherein
the video data comprises a plurality of frames of image data; and
acquiring the environmental parameters related to the denoising in the environment of the mobile terminal comprises:
 acquiring a plurality of reference parameters by acquiring a plurality of environmental parameters at various time points between a current frame of image data and a previous frame of image data and determining each of the plurality of environmental parameters as a reference parameter; and
 smoothing the plurality of reference parameters, and determining smoothing results as the environmental parameters of the current frame of image data.

5. The method according to claim 4, wherein smoothing the plurality of reference parameters, and determining the smoothing results as the environmental parameters of the current frame of image data comprise:
 setting a reference weight for each of the plurality of reference parameters;
 calculating a fourth product of each of the plurality of reference parameters and the reference weight of each of the plurality of reference parameters; and
 calculating a ratio of a first target value to a second target value, and determining the ratio as the environmental parameters of the current frame of image data, wherein the first target value is a sum of all fourth products, and the second target value is a sum of all reference weights.

6. The method according to claim 5, wherein setting the reference weight for each of the plurality of reference parameters comprises:
 determining a time point for acquiring each of the plurality of reference parameters; and
 setting the reference weight for each of the plurality of reference parameters based on the time point, wherein the reference weight is positively correlated with the time point.

7. The method according to claim 1, wherein calculating the extent of conflict between the environment and the denoising based on the environmental parameters comprises:
 setting, in response to at least one of the environmental parameters being acquired, the target weight for each of the at least one environmental parameter;
 calculating a fifth product of each of the at least one environmental parameter and the target weight of each of the at least one environmental parameter; and
 calculating a sum of all fifth products, and determining the sum as the extent of conflict between the environment and the denoising.

8. The method according to claim 1, wherein determining, based on the extent of conflict, the state of denoising the video data comprises:
 comparing the extent of conflict with a predetermined threshold;
 disallowing, in response to the extent of conflict being greater than the predetermined threshold, denoising the video data; and
 allowing, in response to the extent of conflict being less than or equal to the predetermined threshold, denoising the video data.

9. The method according to claim 1, wherein
the target parameters comprise a motion strength of the mobile terminal in an exterior environment and a luminance of light in the exterior environment; and
calculating the strength of the denoising based on the target parameters comprises:
 calculating a sixth product of the motion strength and a predetermined motion weight;
 calculating a seventh product of the luminance and a predetermined luminance weight; and
 calculating a sum of the sixth product, the seventh product, and a predetermined adjustment parameter, and determining the sum as the strength of the denoising.

10. The method according to claim 1, wherein performing the denoising on the video data based on the strength comprises:
 setting a window based on the strength in response to the denoising being two-dimensional denoising, wherein a size of the window is positively correlated with the strength; and
 filtering or block matching the video data using the window.

11. A video denoising mobile terminal, comprising:
 one or more processors;
 a memory, configured to store one or more programs;
 wherein the one or more processors, when loading and running the one or more programs, are caused to perform:
 acquiring video data;
 acquiring environmental parameters related to denoising in an environment of the mobile terminal;
 calculating an extent of conflict between the environment and the denoising based on the environmental parameters;
 determining, based on the extent of conflict, a state of denoising the video data;
 selecting environmental parameters functioned in the denoising from the acquired environmental parameters related to the denoising in the case that the state allows denoising the video data, and determining the selected environmental parameters as target parameters;
 calculating a strength of the denoising based on the target parameters, wherein the strength of the denoising is positively correlated with the target parameters; and
 performing the denoising on the video data based on the strength, wherein calculating the extent of conflict between the environment and the denoising based on the environmental parameters comprises:

substituting the environmental parameters related to the denoising into a predetermined mapping function, calculating a matching degree of a current environment of the mobile terminal and the denoising, and determining the matching degree as the extent of conflict, wherein a target weight is set for each of the environmental parameters to adjust importance of the environmental parameters; and wherein performing the denoising on the video data based on the strength comprises:

determining a first mixing coefficient generated for reference image data in response to the denoising being three-dimensional denoising, wherein the reference image data is a previous frame of image data with noise reduced;

calculating an eighth product of the strength and the first mixing coefficient, determining the eighth product as a new first mixing coefficient, and setting the new first mixing coefficient for the reference image data;

calculating a second mixing coefficient based on the new first mixing coefficient, and setting the second mixing coefficient for original image data, wherein the original image data is a current frame of image data to be noise reduced; and acquiring target image data by superposing the original image data with the second mixing coefficient on the reference image data with the new first mixing coefficient.

12. A non-transitory computer-readable storage medium storing one or more computer programs therein, wherein the one or more computer programs, when loaded and run by a processor, cause the processor to perform:

acquiring video data;

acquiring environmental parameters related to denoising in an environment of a mobile terminal;

calculating an extent of conflict between the environment and the denoising based on the environmental parameters;

determining, based on the extent of conflict, a state of denoising the video data;

selecting environmental parameters functioned in the denoising from the acquired environmental parameters related to the denoising in the case that the state allows denoising the video data, and determining the selected environmental parameters as target parameters;

calculating a strength of the denoising based on the target parameters, wherein the strength of the denoising is positively correlated with the target parameters; and performing the denoising on the video data based on the strength, wherein calculating the extent of conflict between the environment and the denoising based on the environmental parameters comprises:

substituting the environmental parameters related to the denoising into a predetermined mapping function, calculating a matching degree of a current environment of the mobile terminal and the denoising, and determining the matching degree as the extent of conflict, wherein a target weight is set for each of the environmental parameters to adjust importance of the environmental parameters; and wherein performing the denoising on the video data based on the strength comprises:

determining a first mixing coefficient generated for reference image data in response to the denoising being three-dimensional denoising, wherein the reference image data is a previous frame of image data with noise reduced;

calculating an eighth product of the strength and the first mixing coefficient, determining the eighth product as a new first mixing coefficient, and setting the new first mixing coefficient for the reference image data;

calculating a second mixing coefficient based on the new first mixing coefficient, and setting the second mixing coefficient for original image data, wherein the original image data is a current frame of image data to be noise reduced; and acquiring target image data by superposing the original image data with the second mixing coefficient on the reference image data with the new first mixing coefficient.

13. The video denoising mobile terminal according to claim 11, wherein the environment comprises an exterior environment and an interior environment, and the environmental parameters comprise at least one of a motion strength of the mobile terminal in the exterior environment, a luminance of light in the exterior environment, and a temperature in the interior environment.

14. The video denoising mobile terminal according to claim 11, wherein the environment comprises an exterior environment and an interior environment, and the environmental parameters comprise a motion strength of the mobile terminal in the exterior environment, and wherein the one or more processors, when loading and running the one or more programs, are caused to perform:

detecting a first acceleration of motion of the mobile terminal in an X-axis direction, a second acceleration of motion of the mobile terminal in a Y-axis direction, and a third acceleration of motion of the mobile terminal in a Z-axis direction in the exterior environment;

calculating a first product of the first acceleration and a predetermined first acceleration weight;

calculating a second product of the second acceleration and a predetermined second acceleration weight;

calculating a third product of the third acceleration and a predetermined third acceleration weight; and calculating a sum of the first product, the second product, and the third product, and determining the sum as the motion strength of the mobile terminal in the exterior environment.

15. The video denoising mobile terminal according to claim 11, wherein the video data comprises a plurality of frames of image data; and the one or more processors, when loading and running the one or more programs, are caused to perform:

acquiring a plurality of reference parameters by acquiring a plurality of environmental parameters at various time points between the current frame of image data and the previous frame of image data and determining each of the plurality of environmental parameters as a reference parameter; and smoothing the plurality of reference parameters, and determining smoothing results as the environmental parameters of the current frame of image data.

16. The video denoising mobile terminal according to claim 15, wherein the one or more processors, when loading and running the one or more programs, are caused to perform:

setting a reference weight for each of the plurality of reference parameters;

calculating a fourth product of each of the plurality of reference parameters and the reference weight of each of the plurality of reference parameters; and calculating a ratio of a first target value to a second target value, and determining the ratio as the environmental parameters of the current frame of image data, wherein the first target value is a sum of all fourth products, and the second target value is a sum of all reference weights.

17. The video denoising mobile terminal according to claim 16, wherein the one or more processors, when loading and running the one or more programs, are caused to perform:

determining a time point for acquiring each of the plurality of reference parameters; and setting the reference weight for each of the plurality of reference parameters based on the time point, wherein the reference weight is positively correlated with the time point.

18. The video denoising mobile terminal according to claim 11, wherein the one or more processors, when loading and running the one or more programs, are caused to perform:

setting, in response to at least one of the environmental parameters being acquired, the target weight for each of the at least one environmental parameter;

calculating a fifth product of each of the at least one environmental parameter and the target weight of each of the at least one environmental parameter; and calculating a sum of all fifth products, and determining the sum as the extent of conflict between the environment and the denoising.

* * * * *